US006992883B2

(12) United States Patent
Oh

(10) Patent No.: US 6,992,883 B2
(45) Date of Patent: Jan. 31, 2006

(54) DISPLAY APPARATUS FOR VEHICLES

(75) Inventor: Tae Seung Oh, Inchun (KR)

(73) Assignee: Korea Technology Industry Co., Ltd., Junrabuk-do (KR)

( * ) Notice: Subject to any disclaimer, the term of this patent is extended or adjusted under 35 U.S.C. 154(b) by 0 days.

(21) Appl. No.: 10/728,990

(22) Filed: Dec. 8, 2003

(65) Prior Publication Data
US 2005/0122670 A1 Jun. 9, 2005

(51) Int. Cl.
G06F 1/16 (2006.01)

(52) U.S. Cl. ...................................... 361/681; 348/794

(58) Field of Classification Search ........ 361/679–686, 361/724–727, 689, 671; 360/91.01, 98.01, 360/137; 369/75.11–82; 345/173, 905, 345/169, 87; 248/922, 912, 324, 291.1, 27.1, 248/125.1, 223.1, 223.3, 223.6, 223.41, 225.1, 248/230, 458, 238.1, 917–924; 348/837, 348/836, 794; 307/9.1, 10.1; 296/37.7; 312/245, 7.2, 223.1, 209, 223.2, 107
See application file for complete search history.

(56) References Cited

U.S. PATENT DOCUMENTS 6,339,455 B1 * 1/2002 Allan et al. ................. 348/837
6,466,278 B1 * 10/2002 Harrison et al. ............. 348/836
6,557,812 B2 * 5/2003 Kutzehr et al. .............. 248/476
6,633,347 B2 * 10/2003 Kitazawa ..................... 348/837
2002/0149708 A1 * 10/2002 Nagata et al. ............... 348/837

* cited by examiner

Primary Examiner—Anatoly Vortman
Assistant Examiner—Corey Broussard
(74) Attorney, Agent, or Firm—Nixon Peabody LLP

(57) ABSTRACT

A display apparatus for vehicles is provided. The display apparatus for vehicles comprises a disc player comprising a display mounting unit, wherein a connection plate of a display unit is coupled to the bottom surface of the display mounting unit in a stacked form, or separated from the bottom surface; the display unit which comprises the connection plate having second fixing parts enabling the display unit to be coupled with the display mounting unit in a stacked form facing each other, and a screen unit which is installed on the connection plate through a hinge so as to rotate about the hinge, is capable of being folded and unfolded; and fixing components which allow the disc player and/or the display unit to be fixed to the ceiling of the vehicle. The display apparatus allows a purchaser to select a disc player as an option item and easily replace only a defective part. Particularly, the display apparatus has an advantage of easy installation and separation.

10 Claims, 7 Drawing Sheets

DISPLAY APPARATUS FOR VEHICLES

BACKGROUND OF THE INVENTION

1. Field of the Invention

The present invention relates to a display apparatus, and more particularly, to a display apparatus which is mounted on the ceiling of a vehicle such as a car and enables passengers to watch movies or TV programs and to receive information.

2. Description of the Related Art

There are a variety of display apparatuses for vehicles, including those which can be used after mounted on the ceiling or the dashboard of a vehicle. Among them, the present invention relates to display apparatuses that can be used after mounted on the ceiling of a vehicle.

Prior art vehicle display apparatuses can be broken down to two types, one with a disc player such as a DVD player, mounted on the ceiling of a vehicle, and capable of being folded or unfolded, and the other without a disc player such as a DVD player and only with a display unit mounted on the ceiling and capable of being folded or unfolded.

An example of the former is disclosed in U.S. Pat. No. 6,339,455 by William L. Allan et al. Here, a DVD player is stowed in a TV housing. This display apparatus is not appropriate to a vehicle in which a disc player such as a DVD player is separately installed.

In a vehicle in which a disc player such as a DVD player is separately installed, a display apparatus without a disc player is appropriate and an example of this is disclosed in U.S. Pat. No. 6,557,812 by Roland Kutzehr et al. This patented apparatus is not appropriate to a vehicle in which a DVD player is not installed separately. In this case, the owner of the vehicle should buy a separate disc player such as a DVD player.

SUMMARY OF THE INVENTION

The present invention provides a display apparatus in which depending on whether or not a disc player such as a DVD player is installed in a vehicle only a needed part can be selected and used.

The present invention also provides a display apparatus in which even though any one of a disc player, such as a DVD player, and a display unit is broken or out of order, the display apparatus can be used after only the broken part is easily replaced.

The present invention also provides a display unit appropriate to be used in a display apparatus of the present invention.

The present invention also provides a disc player, such as a DVD player, appropriate to be used in a display apparatus of the present invention.

According to an aspect of the present invention, there is provided a display apparatus for a vehicle comprising: a disc player which comprises first fixing parts enabling fixation to the ceiling of the vehicle and a display mounting unit, wherein a connection plate of a display unit is coupled to the bottom surface of the display mounting unit in a stacked form, or separated from the bottom surface; the display unit which comprises the connection plate having second fixing parts enabling the display unit to be coupled with the display mounting unit in a stacked form facing each other, and a screen unit which is installed on the connection plate through a hinge so as to rotate about the hinge, is capable of being folded and unfolded, and displays images according to a video signal input from the disc player; and a fixing unit which allows the disc player and/or the display unit to be fixed to the ceiling of the vehicle.

Preferably, the first fixing parts are holes formed on the disc player and the second fixing parts are formed on the connection plate and arranged on a straight line with the first fixing parts, and the fixing unit comprises a bracket which has screw coupling holes and is fixed to the ceiling of the vehicle, and screw members which are fixed to the screw coupling holes through the first and second fixing parts so that the disc player and the connection plate are fixed to the bottom surface of the bracket in a stacked form.

When necessary, the first fixing parts of the disc player are formed as holes so that the disc player is fixed to the ceiling of the vehicle, and coupling holes for fixing the connection plate are further formed on the disc player, and each of the second fixing parts of the connection plate are arranged on a straight line with one of the coupling holes to form one hole so that the connection plate is fixed to the bottom surface of the disc player, and the fixing unit comprises first screw members which are fixed to the ceiling of the vehicle through the first fixing parts to fix the disc player to the ceiling of the vehicle, and second screw members which are fixed to the coupling holes through the second fixing parts to fix the connection plate to the disc player.

When necessary, a fist coupling unit to fix the connection plate in an interference fit method is formed on the disc player, and a second coupling unit that is detachably coupled to the first coupling unit is formed on the connection plate, and the second fixing parts are holes to fix the connection plate to the ceiling of the vehicle by a fixing unit such as screw members when the disc player is not provided.

Preferably, the first coupling unit comprises a round protrusion formed on the bottom surface of the disc player, a plurality of broadly L-shaped guide grooves formed with predetermined angular intervals on the outer side surface of the round protrusion, a coupling threshold formed at the inside end of each guide groove, and a spring groove formed at the center of the round protrusion, and the second coupling unit is formed on the top surface of the connection plate and comprises a groove unit which is coupled with the outer circumference surface of the first coupling unit, coupling protrusions protruding inwards from the inside surface of the groove unit, a protrusion unit disposed on the central part of the groove unit, and a spring, one end of which is coupled with the protrusion unit and the other is inserted into the spring groove.

Of course, the locations of the first joint unit and the second joint unit are interchangeable. Also, the locations of the guide groove and the coupling protrusion are interchangeable.

Preferably, an aperture through which power supply lines and signal lines are passing is formed on the disc player.

According to another aspect of the present invention, there is provided a disc player comprising: first fixing parts enabling fixation to the ceiling of a vehicle; and a display mounting unit, wherein a connection plate of a display unit is coupled to the bottom surface of the display mounting unit in a stacked form, or separated from the bottom surface, and the disc player is fixed to the ceiling of the vehicle together with a display unit in a stacked form by a fixing unit, the display unit comprising: the connection plate having second fixing parts enabling the display unit to be coupled with the display mounting unit in a stacked form facing each other; and a screen unit which is installed on the connection plate through a hinge so as to rotate about the hinge, is capable of being folded and unfolded, and displays images according to a video signal input from the disc player.

Preferably, on at least one side of the disc player an aperture through which power supply lines and signal lines are passing is formed and the disc player has the characteristics described above for the display apparatus.

According to still another aspect of the present invention, there is provided a display unit comprising: a connection plate having second fixing parts enabling the display unit to be coupled with the display mounting unit of a disc player in a stacked form facing each other; and a screen unit which is installed on the connection plate through a hinge so as to rotate about the hinge, is capable of being folded and unfolded, and displays images according to a video signal input from the disc player, wherein the display unit is fixed together with the disc player, to the ceiling of the vehicle by a fixing unit and the disc player comprises first fixing parts enabling fixation to the ceiling of the vehicle and the display mounting unit, and the connection plate of the display unit is coupled to the bottom surface of the display mounting unit in a stacked form, or separated from the bottom surface. The display unit has the characteristics described above for the display apparatus.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
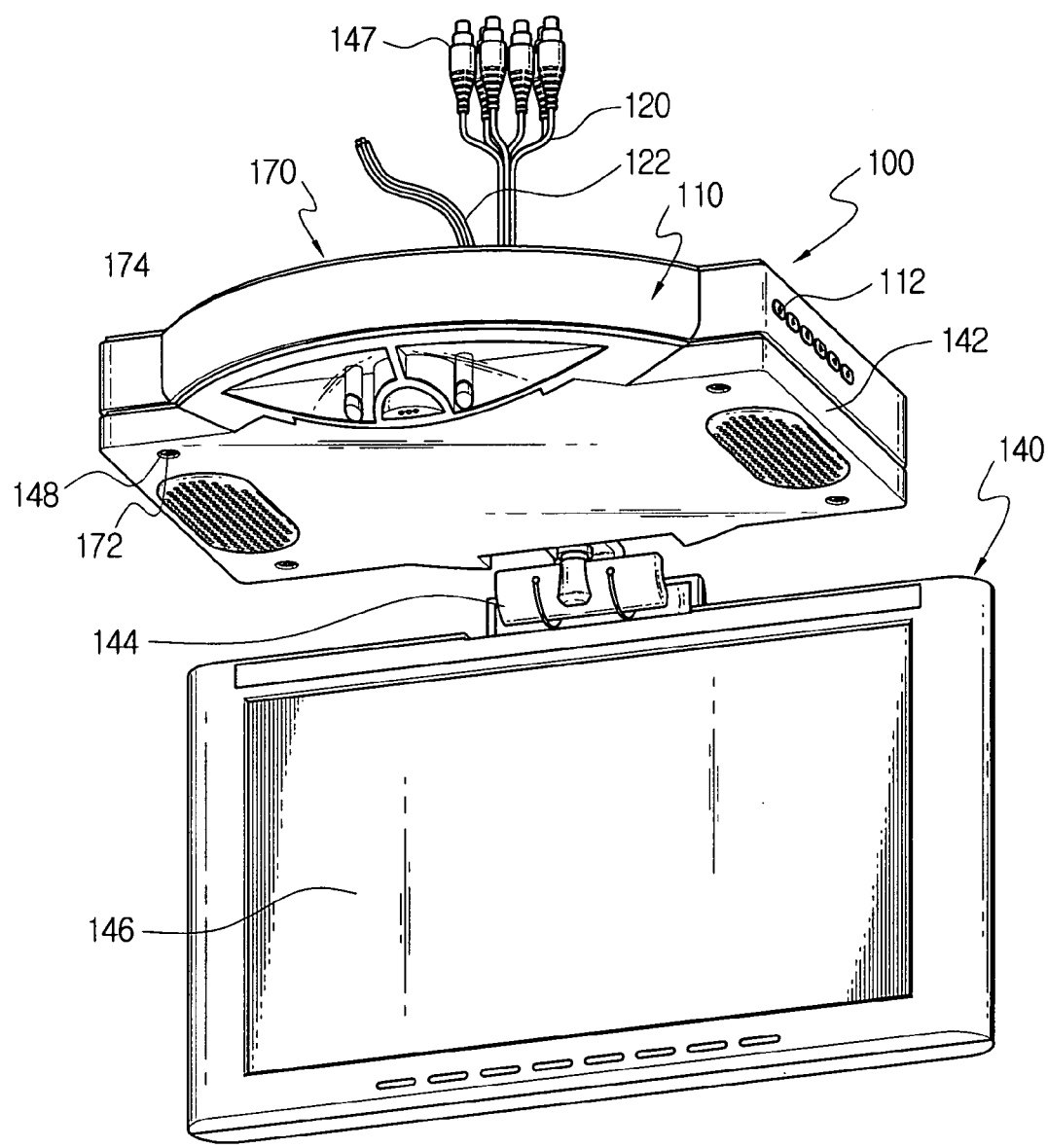
FIG. 1 is a perspective view of a display apparatus according to the present invention when the screen unit of the apparatus is unfolded.
Figure 2:
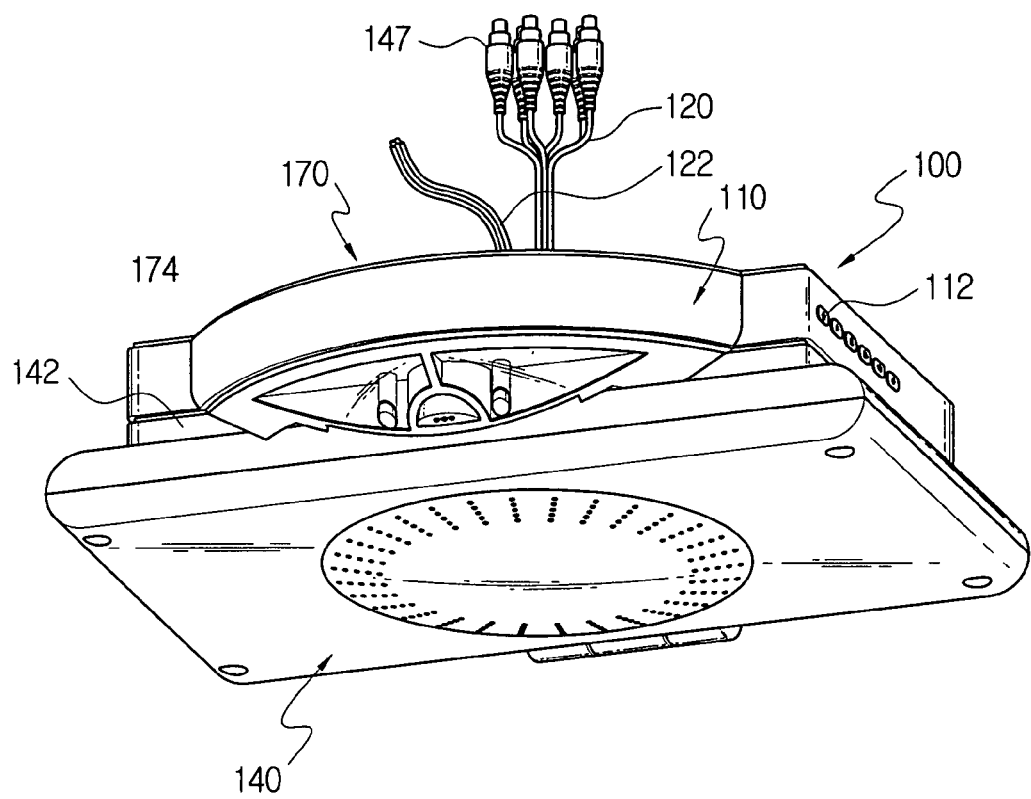
FIG. 2 is a perspective view of the display apparatus of FIG. 1 when the screen is folded.
Figure 3:
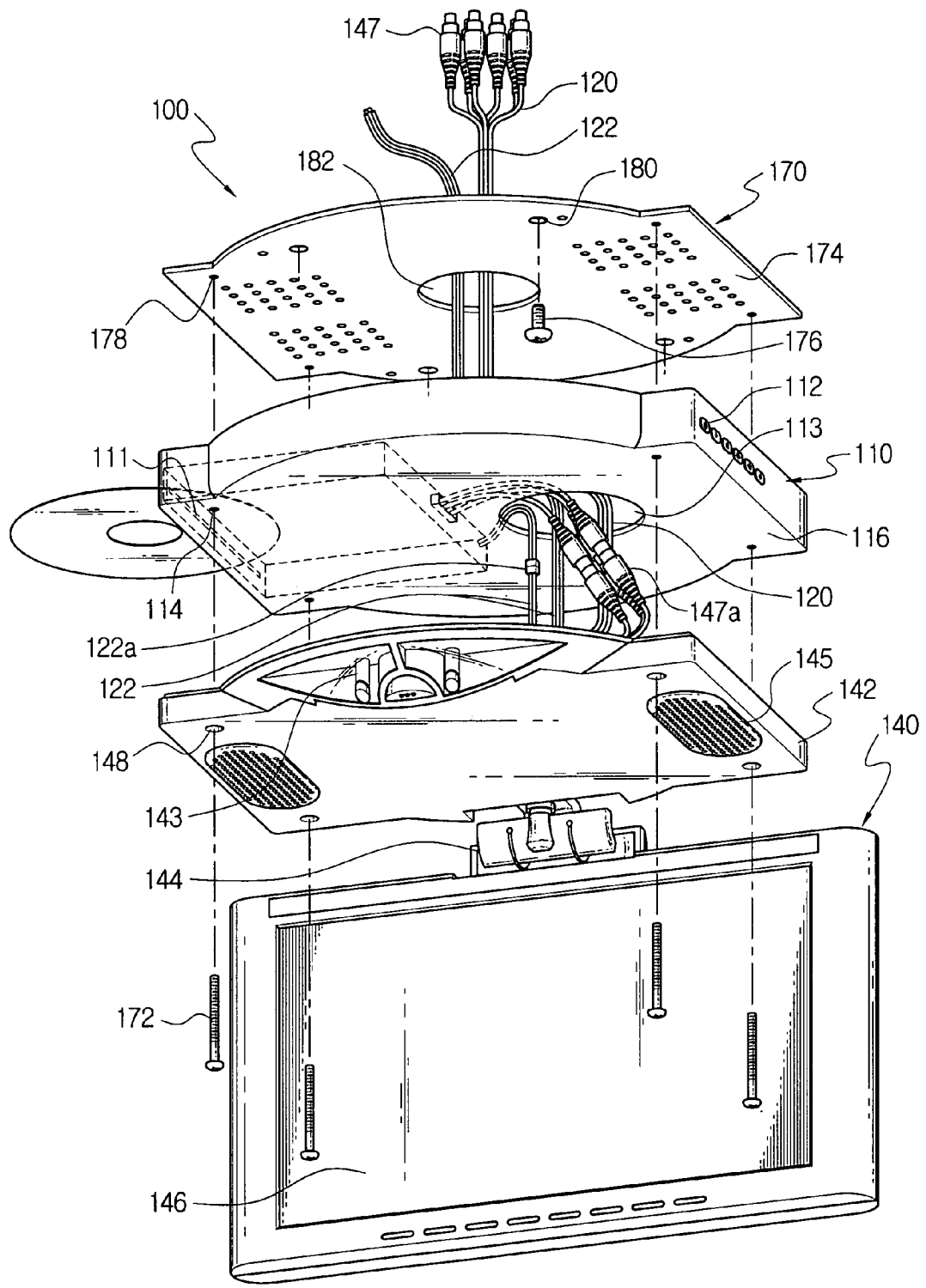
FIG. 3 is an exploded perspective view of the display apparatus of FIG. 1.

FIG. 1 is a perspective view of a display apparatus according to the present invention when the screen unit of the apparatus is unfolded, FIG. 2 is a perspective view of the display apparatus of FIG. 1 when the screen is folded, and FIG. 3 is an exploded perspective view of the display apparatus of FIG. 1.

As shown in FIGS. 1 through 3, a display apparatus 100 according to the present invention comprises a disc player 110 such as a DVD player. On one side of this disc player 110, a disc slot 111 into which a disc such as a DVD is inserted is disposed and on the other side a plurality of buttons 112 are disposed. Examples of this disc player 110 include a CD player in addition to a DVD player. This disc player reproduces data stored on a disc such as a CD or a DVD and provides to a display unit 140 which will be explained later. Of course, when desired, this disc player 110 may have a function to receive TV broadcasts, convert into digital data, and store in a data storage medium such as a DVD or a CD. This disc player 110 has a first fixing part which enables to fix the disc player 110 on the ceiling of a vehicle such as a passenger car, a bus, a train, an airplane, and a ship. Preferably, the first fixing part 114 is formed around each of four corners of the disc player 110. In the vicinity of the center of this disc player 110, formed is an aperture to provide a path or an installation space for power supply lines to receive power through, for example, 2-pin jacks 122a, from the display unit 140, signal lines 120, and connection terminals 147a to connect the disc player 100 and the display unit 140. At the bottom of the disc player 110, a display mounting unit 116 is disposed so that a connection plate 142, which will be explained later, of the display unit 140 can be mounted in a stacked form or separated.

The display apparatus 100 according to the present invention comprises the display unit 140 which can be easily mounted on or separate from the display mounting unit 116 of the disc player 110. This display unit 140 comprises the connection plate 142 which is mounted on the display mounting unit 116 in a stacked form, facing the display mounting unit 116, and a screen unit 146 which is coupled with this connection plate 142 through a hinge 144 such that the screen unit 146 can be folded to a broadly horizontal position and unfolded to a broadly vertical position. Of course, when it is unfolded the screen unit 146 can be rotated to the right or to the left about the hinge.

On the connection plate 142, disposed are second fixing parts 148 in the form of holes for fixing to the display mounting unit 116 of the disc player 110, a ceiling light mounting unit 143 to mount ceiling lights of a vehicle, and speakers 145.

The screen unit 146 is installed such that it can rotate about the hinge. This is designed to enable the screen unit 146, when installed on the ceiling or wall of a vehicle, to be folded or unfolded. This screen unit 146 displays images according to video signals input through the disc player 110 described above. Preferably, this screen unit 146 is formed in a thin one such as an organic electro luminescence (EL) or a plasma display panel (PDP).

The display apparatus 100 according to the present invention comprises a fixing unit 170 to fix the disc player 110 and the display unit 140, described above, to the ceiling or another place of a vehicle. The fixing unit 170 in the present embodiment comprises a bracket to be fixed on the ceiling of a vehicle, screw members 176 to fix the bracket 174 to the ceiling of the vehicle, and screw members 172 to fix the disc player 110 and the display unit 140 to the ceiling of the vehicle through the bracket 174.

Around each of the four corners of the bracket 174, a screw fixing hole 178, through which a screw member 176 for fixing the disc player 110 and the display unit 140 is coupled, is formed. Adjacent to the screw fixing holes 178, holes 180 for coupling screw members 176 for fixing the bracket 174 itself to the ceiling are formed. Around the center of this bracket 174, formed is an aperture 182 to provide a path for signal lines connected to connection terminals for signals to and from the display unit 140 and power supply lines to provide power.

A process for installing the display apparatus shown in FIGS. 1 through 3 will now be explained.

When the power supply lines 122 and the connection terminals 147 and 147a are connected to external power supply lines and other terminals, respectively, screw members 176 are inserted into the holes 180 and the bracket 174 is fixed to the ceiling or another place of the vehicle. Then, when the disc player 110 and the connection plate 142 are placed in a stacked form, each of the second fixing parts 148 is arranged on a straight line with one of first fixing parts 114 to form one hole and through these holes, respective long screw members 172 are inserted and fixed such that the long screw members 172 are fixed to the screw fixing holes 178 of the bracket 174 fixed to the ceiling or another place of the vehicle. Accordingly, the display apparatus 100 according to the present invention with the disc player 110 can be fixed to the ceiling or another place of the vehicle.

That is, while the screen unit 146 is unfolded as shown in FIG. 1, passengers play games, watch TV programs, or watch DVD movies. Then, when passengers do not use it, the screen unit 146 can be folded up as shown in FIG. 2.

Figure 4:
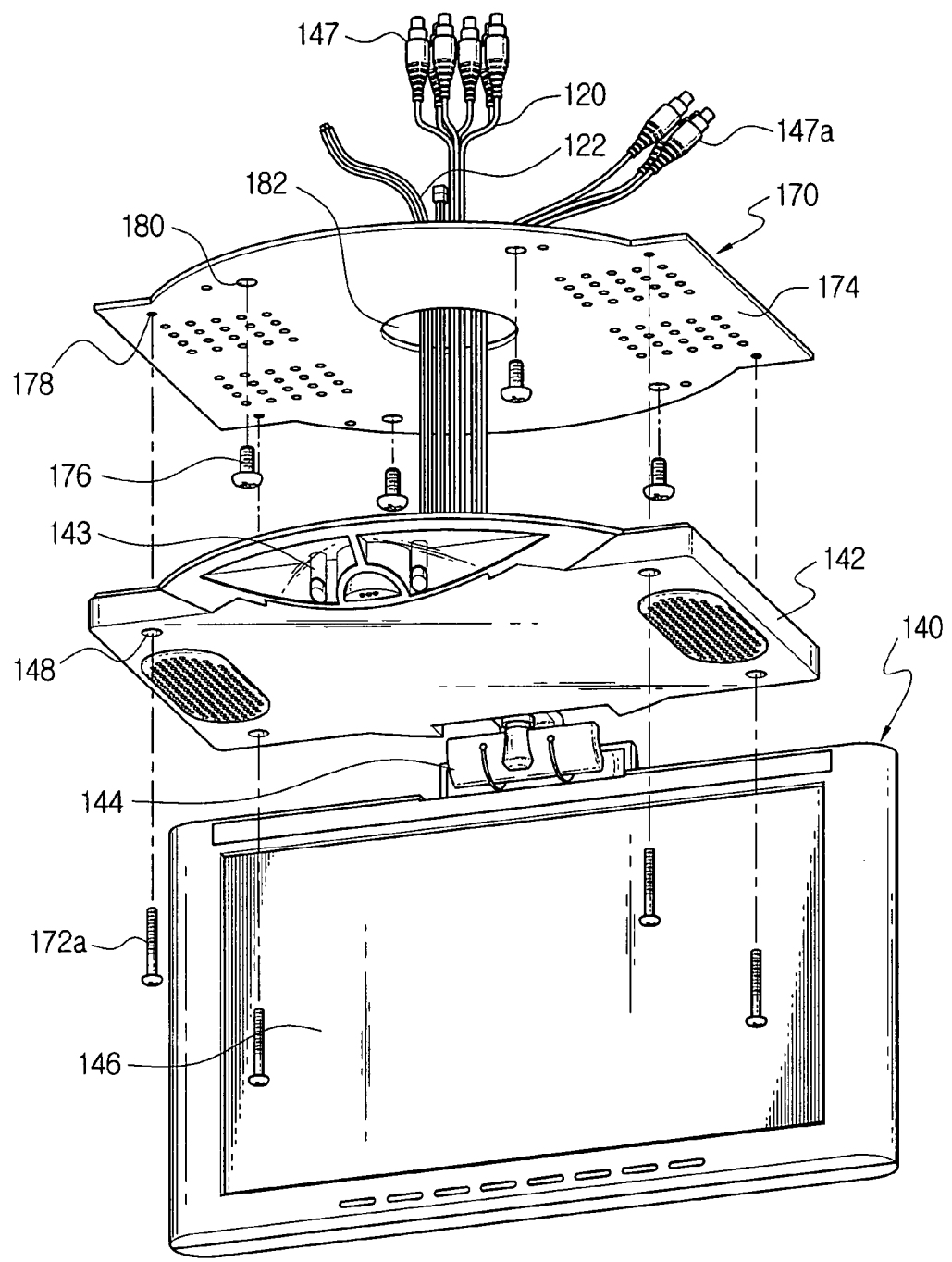
FIG. 4 is an exploded perspective view of an example of a display unit installed alone without a disc player.

FIG. 4 is an exploded perspective view of an example of a display unit installed alone without a disc player.

In a vehicle where a DVD player is already installed in a dashboard or another place of the vehicle, the disc player as shown in FIGS. 1 through 3 is not needed. In this case, the bracket 174 is first fixed to the ceiling of the vehicle through screw members 176, and then, the connection plate 142 of the display unit 140 is directly fixed to the bracket 174 through the screw members 172a. The screw members 172a are inserted into respective second fixing parts 148 in the form of holes and fixed to the screw fixing holes 178 formed on the bracket 174 such that the connection plate 142 is fixed.

That is, when the display apparatus of the present invention is installed, if a separate DVD player or the like is not installed, the disc player as shown in FIGS. 1 through 3 is included, or else, the display apparatus without a disc player 110 can be installed.

Of course, when necessary, the connection plate 142 can be directly fixed to the ceiling of the vehicle through screw members 176 or the like without the bracket 174.

Figure 5:
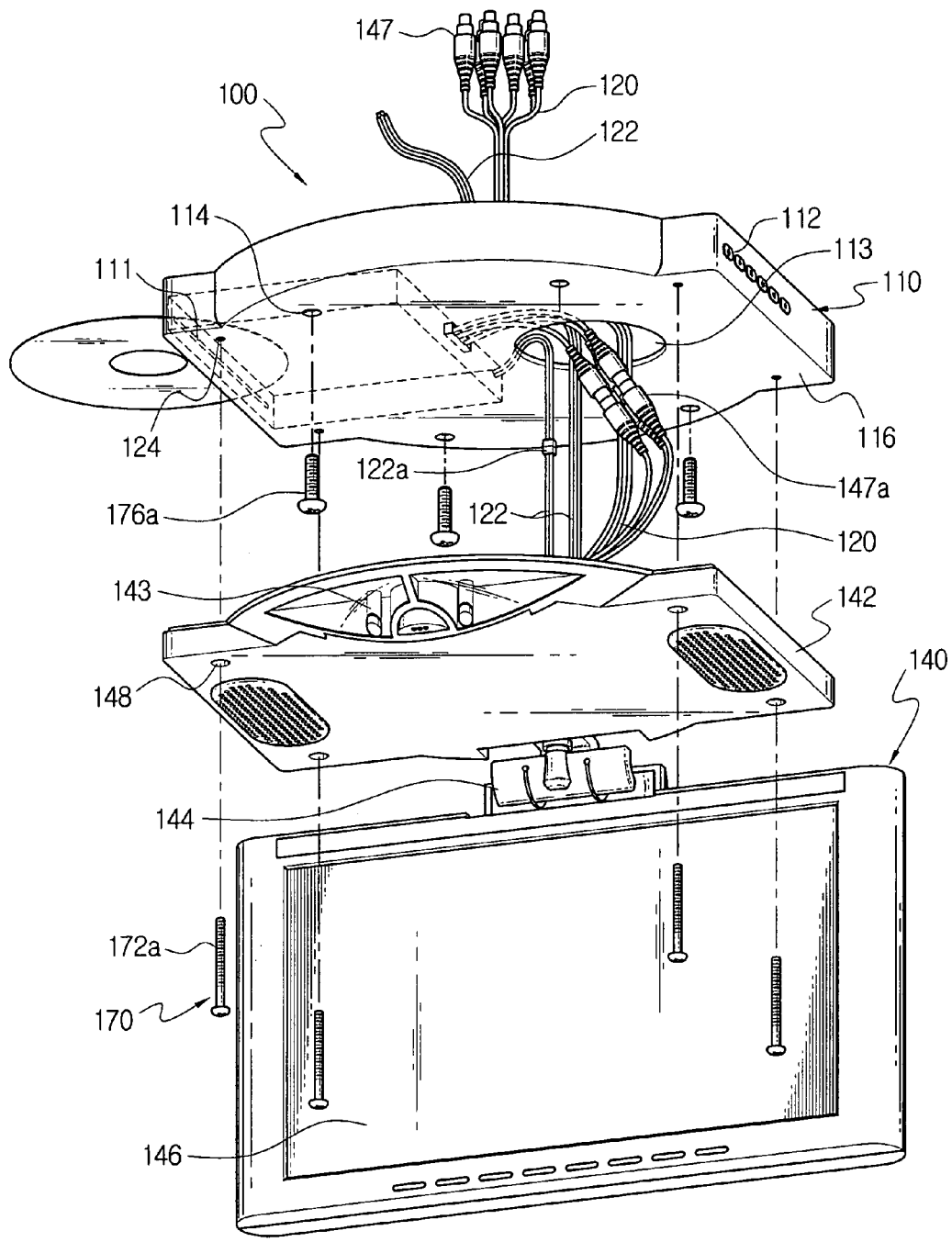
FIG. 5 is an exploded perspective view of an example of a display apparatus according to the present invention installed without a bracket.

FIG. 5 is an exploded perspective view of an example of a display apparatus according to the present invention installed without a bracket.

As shown in FIG. 5, the display apparatus 100 according to the present invention can be constructed without the bracket 174 described above, when necessary.

That is, the disc player 110 further comprises coupling holes 124 in addition to the first fixing parts 114. Here, the first fixing parts 114 are to fix the disc player 110 directly to the ceiling or another place of the vehicle through the first screw members 176a. Of course, the connection plate 142 of the display unit 140 is fixed to the disc player 110 by the second screw members 172a which are inserted through the second fixing parts 148 and fixed to the coupling holes 124. In this case, a spiral should be formed on the inner circumference surface of each coupling hole 124.

Figure 6:
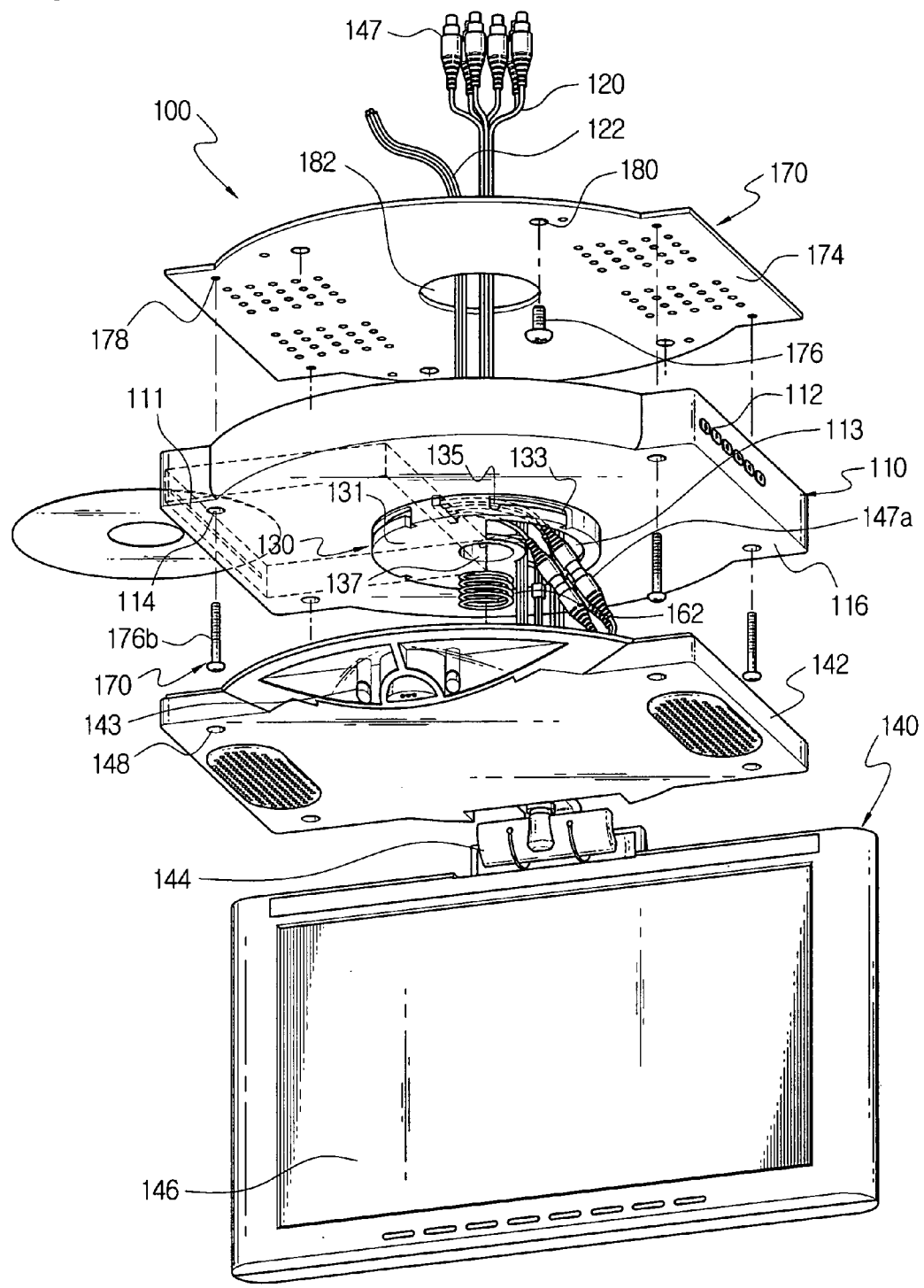
FIG. 6 is an exploded perspective view of another example of a display apparatus according to the present invention.
Figure 7:
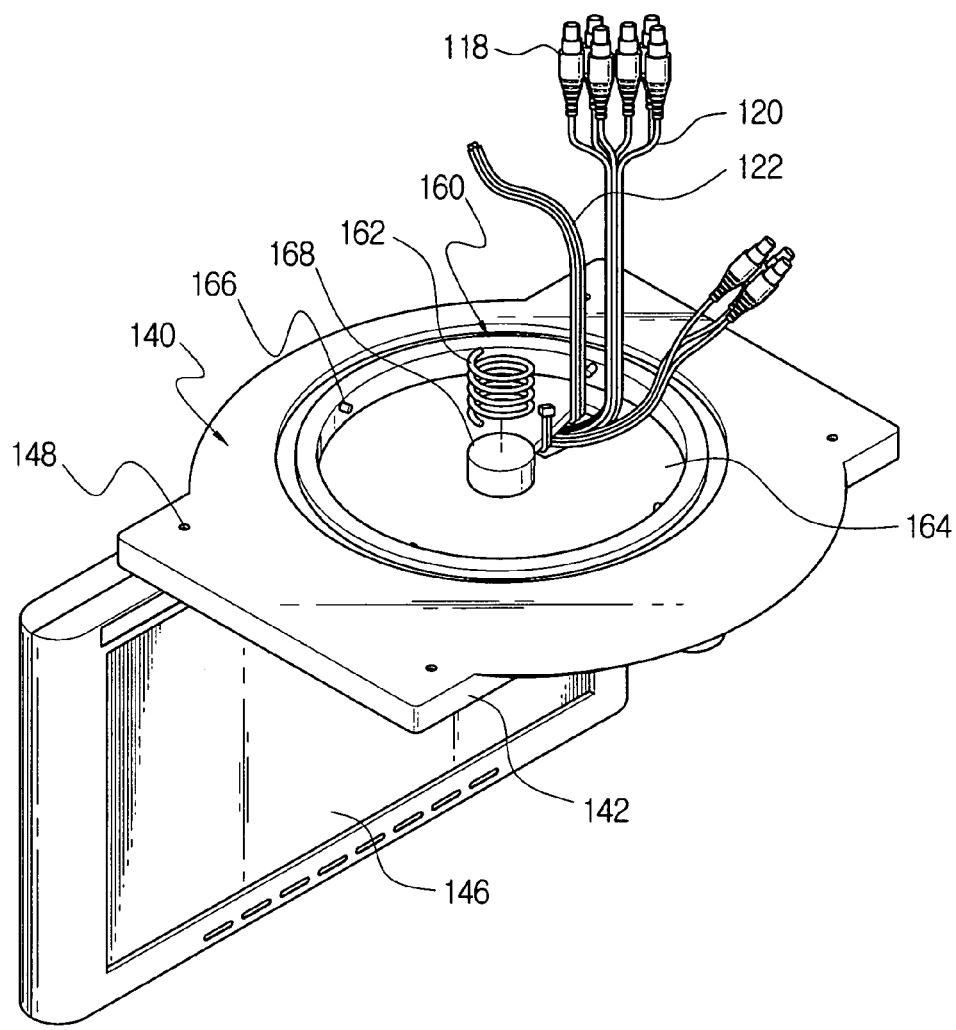
FIG. 7 is a perspective view of the top surface of a support of FIG. 6.

FIG. 6 is an exploded perspective view of another example of a display apparatus according to the present invention, and FIG. 7 is a perspective view of the top surface of a support of FIG. 6.

As shown, a first coupling unit 130 on the bottom surface of the disc player 110 and a second coupling unit 160 on the top surface of the connection plate 142 are formed to face each other so that the disc player 110 and the display unit 140 can be coupled and separated in an interference fit method.

The first coupling unit 130 comprises a round protrusion 131 protruding downwards from the bottom surface of the disc player 110 and a plurality of L-shaped guide grooves 133 formed with predetermined angular intervals on the outer side surface of this round protrusion 131.

At the inside end of the guide groove 133, a coupling threshold 135 is formed and at the center of the round protrusion 131, a spring groove 137 into which a spring 162 can be inserted is formed.

The second coupling unit 160 which is coupled with the first coupling unit 130 is formed on the top surface of the connection plate 142. This second coupling unit 142 has a groove unit 164 which can be coupled with the outer circumference surface of the first coupling unit, and coupling protrusions 166 which are protruding inwards from the inside surface of this groove unit 164. At the center of the groove unit 164, a protrusion unit 168 to which the spring is fixed, is formed.

That is, the disc player 110 and the connection plate 142 of the display unit 140 are arranged to face each other at an angle that the coupling protrusions 166 can be inserted into the guide grooves 133. Then, the connection plate 142 is pushed up and the display unit 140 is fully rotated clockwise. Then if the connection plate 142 is released, the coupling protrusion 166 is coupled to the coupling threshold 135. In this state, the spring 162 applies the elastic power in the direction to extend the distance between the disc player 110 and the connection plate 142 such that the coupling protrusion 166 is not detached from the coupling threshold 135.

When the display unit 140 is desired to be detached from the disc player 110, the connection plate 142 is pushed up and then rotated counterclockwise and then pulled downwards.

In this case, the bracket 174 is fixed to the ceiling or another place of the vehicle by the screw members 176, and the disc player 110 is fixed to the bracket 174 by screw members 176 which are inserted into the first fixing part 114 in the form of holes and then coupled to the screw coupling holes 178. Of course, the locations of the first coupling unit 130 and the second coupling unit 160 are interchangeable and the locations of the guide groove 133 and the coupling protrusion 166 are interchangeable. In addition, a guide groove may be formed on the inner circumference surface of the groove unit when the protrusion is formed on the outer circumference surface of the round protrusion.

The remaining things are the same as described above.

The variations and modifications of the elements used to fix or connect the bracket, the disc player and the display unit, as described above, such as the fixing units, the first fixing part, the second fixing part, the first coupling unit, and the second coupling unit, can be effected by those skilled in the art in a variety of ways within the spirit and scope of the present invention.

As shown in the above description, the display apparatus according to the present invention has the advantage that it allows the owner of a vehicle in which a separate disc player is installed, to purchase only a display unit.

Particularly, it allows the owner to replace only a broken part when any one of a disc player and a display unit is out of order.

In addition, the display apparatus according to the present invention has the advantage that it can be easily installed on or detached from the ceiling of a vehicle.

What is claimed is:

1. A display apparatus for a vehicle comprising:
   a disc player which comprises first fixing parts enabling fixation to the ceiling of the vehicle and a display mounting unit, wherein a connection plate of a display unit is coupled to the bottom surface of the display mounting unit in a stacked form, or separated from the bottom surface;

the display unit which comprises the connection plate having second fixing parts enabling the display unit to be coupled with the display mounting unit in a stacked form facing each other, and a screen unit which is installed on the connection plate through a hinge so as to rotate about the hinge, is capable of being folded and unfolded, and displays images according to a video signal input from the disc player; and a fixing unit which allows the disc player and/or the display unit to be fixed to the ceiling of the vehicle, wherein the first fixing parts are holes formed on the disc player and the second fixing parts are formed on the connection plate and arranged on a straight line with the first fixing parts, and the fixing unit comprises a bracket which has screw coupling holes and is fixed to the ceiling of the vehicle, and screw members which are fixed to the screw coupling holes through the first and second fixing parts so that the disc player and the connection plate are fixed to the bottom surface of the bracket in a stacked form.

2. A display apparatus for a vehicle comprising:

a disc player which comprises first fixing parts enabling fixation to the ceiling of the vehicle and a display mounting unit, wherein a connection plate of a display unit is coupled to the bottom surface of the display mounting unit in a stacked form, or separated from the bottom surface;

the display unit which comprises the connection plate having second fixing parts enabling the display unit to be coupled with the display mounting unit in a stacked form facing each other, and a screen unit which is installed on the connection plate through a hinge so as to rotate about the hinge, is capable of being folded and unfolded, and displays images according to a video signal input from the disc player; and a fixing unit which allows the disc player and/or the display unit to be fixed to the ceiling of the vehicle, wherein a first coupling unit to fix the connection plate in an interference fit method is formed on the disc player, and a second coupling unit that is detachably coupled to the first coupling unit is formed on the connection plate, and the second fixing parts are holes to fix the connection plate to the ceiling of the vehicle by a fixing unit such as screw members when the disc player is not provided.

3. The display apparatus of claim 2, wherein the first coupling unit comprises a round protrusion formed on the bottom surface of the disc player, a plurality of broadly L-shaped guide grooves formed with predetermined angular intervals on the outer side surface of the round protrusion, a coupling threshold formed at the inside end of each guide groove, and a spring groove formed at the center of the round protrusion, and the second coupling unit is formed on the top surface of the connection plate and comprises a groove unit which is coupled with the outer circumference surface of the first coupling unit; coupling protrusions protruding inwards from the inside surface of the groove unit, a protrusion unit disposed on the central part of the groove unit, and a spring, one end of which is coupled with the protrusion unit and the other is inserted into the spring groove.

4. The display apparatus of claim 2, wherein the first coupling unit comprises a round protrusion formed on the top surface of the connection plate, a plurality of broadly L-shaped guide grooves formed with predetermined angular intervals on the outer side surface of the round protrusion, a coupling threshold formed at the inside end of each guide groove, and a spring groove formed at the center of the round protrusion, and the second coupling unit is formed on the bottom surface of the disc player, and comprises a groove unit which is coupled with the outer circumference surface of the first coupling unit, coupling protrusions protruding inwards from the inside surface of the groove unit, a protrusion unit disposed on the central part of the groove unit, and a spring, one end of which is coupled with the protrusion unit and the other is inserted into the spring groove.

5. A disc player comprising:

first fixing parts enabling fixation to the ceiling of a vehicle; and a display mounting unit, wherein a connection plate of a display unit is coupled to the bottom surface of the display mounting unit in a stacked form, or separated from the bottom surface, and the disc player is fixed to the ceiling of the vehicle together with a display unit in a stacked form by a fixing unit, the display unit comprising:

the connection plate having second fixing parts enabling the display unit to be coupled wit the display mounting unit in a stacked form facing each other; and a screen unit which is installed on the connection plate through a hinge so as to rotate about the hinge, is capable of being folded and unfolded, and displays images according to a video signal input from the disc player, wherein each of the first fixing parts is a hole to be arranged on a straight line with one of the second fixing parts formed as holes on the connection plate, to enable the disc player and the connection plate to be fixed to the ceiling of the vehicle in a stacked form, by a fixing unit comprising:

a bracket which has screw coupling holes and is fixed to the ceiling of the vehicle; and screw members which are fixed to the screw coupling holes through the first and second fixing parts so that the disc player and the connection plate are fixed to the bottom surface of the bracket in a stacked form.

6. A disc player comprising:

a display mounting unit, wherein a connection plate of a display unit is coupled to the bottom surface of the display mounting unit in a stacked form, or separated from the bottom surface, and the disc player is fixed to the ceiling of the vehicle together with a display unit in a stacked form by a fixing unit, the display unit comprising:

the connection plate having second fixing parts enabling the display unit to be coupled with the display mounting unit in a stacked form facing each other; and a screen unit which is installed on the connection plate through a hinge so as to rotate about the hinge, is capable of being folded and unfolded, and displays images according to a video signal input from the disc player, wherein a first coupling unit which is coupled with the second coupling unit formed on the connection plate of the display unit in an interference fit method is formed on the disc player.

7. The disc player of claim 6, wherein the first coupling unit comprises a round protrusion formed on the bottom surface of the disc player, a plurality of broadly L-shaped guide grooves formed with predetermined angular intervals on the outer side surface of the round protrusion, a coupling threshold formed at the inside end of each guide groove, and a spring groove formed at the center of the round protrusion.

8. A display unit comprising:

a connection plate having second fixing parts enabling the display unit to be coupled with the display mounting unit of a disc player in a stacked form facing each other; and a screen unit which is installed on the connection plate through a hinge so as to rotate about the hinge, is capable of being folded and unfolded, and displays images according to a video signal input from the disc player, wherein the display unit is fixed together with the disc player, to the ceiling of the vehicle by a fixing unit and the disc player comprises first fixing parts enabling fixation to the ceiling of the vehicle and the display mounting unit, and the connection plate of the display unit is coupled to the bottom surface of the display mounting unit in a stacked form, or separated from the bottom surface, wherein each of the second fixing parts is a hole to be arranged on a straight line with one of the first fixing parts formed as holes on the disc player, to enable the disc player and the connection plate to be fixed to the ceiling of the vehicle in a stacked form, by a fixing unit comprising a bracket which has screw coupling holes and is fixed to the ceiling of the vehicle, and screw members which are fixed to the screw coupling holes through the first and second fixing parts so that the disc player and the connection plate are fixed to the bottom surface of the bracket in a stacked form.

9. A display unit comprising:

a connection plate having second fixing parts enabling the display unit to be coupled with the display mounting unit of a disc player in a stacked form facing each other; and a screen unit which is installed on the connection plate through a hinge so as to rotate about the hinge, is capable of being folded and unfolded, and displays images according to a video signal input from the disc player, wherein the display unit is fixed together with the disc player, to the ceiling of the vehicle by a fixing unit and the disc player comprises first fixing parts enabling fixation to the ceiling of the vehicle and the display mounting unit, and the connection plate of the display unit is coupled to the bottom surface of the display mounting unit in a stacked form, or separated from the bottom surface, wherein second coupling unit which is coupled with the first coupling unit formed on the disc player in an interference fit method is formed on the connection plate.

10. The display unit of claim 9, wherein the second coupling unit is formed on the top surface of the connection plate and comprises a groove unit which is coupled with the outer circumference surface of the first coupling unit, coupling protrusions protruding inwards from the inside surface of the groove unit, a protrusion unit disposed on the central part of the groove unit, and a spring, one end of which is coupled with the protrusion unit and the other is inserted into the spring groove.

* * * * *